(12) United States Patent
Manickavasagam et al.

(10) Patent No.: US 7,873,260 B2
(45) Date of Patent: Jan. 18, 2011

(54) VIDEO AND AUDIO PROCESSING CONTROL

(75) Inventors: Senthilkumar Manickavasagam, Randolph, MA (US); Dennis J. Wilkinson, II, East Freetown, MA (US)

(73) Assignee: Acoustic Technology LLC, Las Vegas, NV (US)

( * ) Notice: Subject to any disclaimer, the term of this patent is extended or adjusted under 35 U.S.C. 154(b) by 1599 days.

(21) Appl. No.: 10/077,107

(22) Filed: Feb. 15, 2002

(65) Prior Publication Data

US 2003/0156821 A1    Aug. 21, 2003

(51) Int. Cl.
*H04N 5/76*    (2006.01)
*G11B 27/00*    (2006.01)

(52) U.S. Cl. ...................................... 386/52
(58) Field of Classification Search .................. 386/52, 386/125, 64, 4, 53, 55
See application file for complete search history.

(56) References Cited

U.S. PATENT DOCUMENTS

| | | | |
|---|---|---|---|
| 5,369,443 A * | 11/1994 | Woodham | 348/578 |
| 5,404,316 A * | 4/1995 | Klingler et al. | 715/723 |
| 5,508,940 A * | 4/1996 | Rossmere et al. | 715/723 |
| 5,872,565 A * | 2/1999 | Greaves et al. | 715/723 |
| 5,999,173 A * | 12/1999 | Ubillos | 715/724 |
| 6,430,355 B1 * | 8/2002 | Nagasawa | 386/52 |
| 6,477,315 B1 * | 11/2002 | Ohomori | 386/55 |
| 6,542,692 B1 * | 4/2003 | Houskeeper | 386/52 |
| 6,546,188 B1 * | 4/2003 | Ishii et al. | 386/52 |
| 6,628,303 B1 * | 9/2003 | Foreman et al. | 715/723 |
| 6,674,955 B2 * | 1/2004 | Matsui et al. | 386/52 |
| 6,763,175 B1 * | 7/2004 | Trottier et al. | 386/52 |
| 6,774,919 B2 * | 8/2004 | Miller et al. | 715/721 |
| 6,970,639 B1 * | 11/2005 | McGrath et al. | 386/52 |
| 7,020,381 B1 * | 3/2006 | Kato et al. | 386/52 |
| 2003/0090506 A1 * | 5/2003 | Moore et al. | 345/730 |

* cited by examiner

*Primary Examiner*—Peter-Anthony Pappas
*Assistant Examiner*—Gelek Topgyal

(57) ABSTRACT

A system for modifying video including a source of a filter stack specifying filter operations to be carried out on a video clip, a filter registry of filter functions including information on filter operations that can be carried out by the filter functions, and a filter planner that receives the filter stack and accesses the registry in order to generate a filter plan specifying filter functions to be used in carrying out the filter operations specified in the filter stack.

56 Claims, 3 Drawing Sheets

VIDEO AND AUDIO PROCESSING CONTROL

BACKGROUND

The invention relates to modifying video and audio.

When a video program is created at a nonlinear video editor, analog video source materials are typically digitized, compressed and stored on disc for later random access for use in creating a video program. Digital source video can also be input into the nonlinear video editor. Segments of the video, also referred to as "video clips," can be taken from different sources, and the beginning and end points can be trimmed as desired during editing. The order of clips is established in a time line to determine the sequence, and the position of a clip can be changed. Clips can be deleted or inserted as desired. During the editing process, the clips of compressed video can be randomly accessed, decompressed and viewed in real time.

The source video can be modified by various "pixel manipulations," which are fine grain processes (such as scale, rotate, blur), and "tools," which are larger grain processes (such as digitizing, color correcting, add to timeline, layer with another clip and master out).

Audio can similarly be modified, e.g., by parametric equalization, high pass/low pass, notch filters.

Compositing involves use of fine grain processes. In compositing applications, it is known to use a process tree to specify a set of transformations, modifications, and effects to be applied to one clip. As used herein, "filter operations" includes operations by compositing and by tools.

SUMMARY

The invention features, in general, a system for modifying video including a source of a filter stack specifying filter operations to be carried out on a video clip, a filter registry including information on filter operations that can be carried out by the filter functions, and a filter planner that receives the filter stack and accesses the registry in order to generate a filter plan specifying filter functions to be used in carrying out the filter operations specified in the filter stack.

Particular embodiments of the invention may include one or more of the following features. In particular embodiments, the system also composites audio associated with the video, and the filter operations include operations to be carried out on an audio segment associated with the video clip. The filter operations in the filter stack are specified by a filter protocol identifier and operating domain. The information on the filter functions in the filter registry are specified by a filter protocol identifier and operating domain. The operating domains include audio and video. The system also includes a plurality of filter functions capable of carrying out the filter operations on a video clip, and a filter executor that receives the filter plan from the filter planner and controls the plurality of filter functions according to the filter plan to carry out the filter operations on the video clip. The system includes a nonlinear video editor including a storage containing video data, a user interface, a computer processor, and video processing circuitry for randomly accessing video data from the storage to output video clips. The filter functions include software filters implemented on the computer processor, hardware filters implemented on the video processing circuitry, and external hardware filters connected to computer processor. The operations can be carried out on software filters and on the hardware filters. The listing of information for a filter function in the registry includes a name and a properties list indicating input and output conditions for the filter function. The properties list indicates whether the domain for the filter function is video, audio, video parameters or audio parameters. The filter operations include, fades, blurs, transitions, dissolves, rotations. The filter plan includes hardware filters and software filters optimized for the filter operations specified in the filter stack. The filter planner can be replaced with a different filter planner to achieve a different optimization.

Embodiments of the invention may include one or more of the following advantages. The operation of the filter planner is transparent to the user, who need not be concerned with the details of the implementation. There could be a number of different filter functions that could carry out a specified filter operation in a filter stack, and the filter planner will select the one that is most appropriate. The filter planner can select both hardware filters and software filters in the same plan.

Other advantages and features of the invention will be apparent from the following description of a preferred embodiment thereof and from the claims.

DETAILED DESCRIPTION

Description of Particular Embodiments

Figure 1:
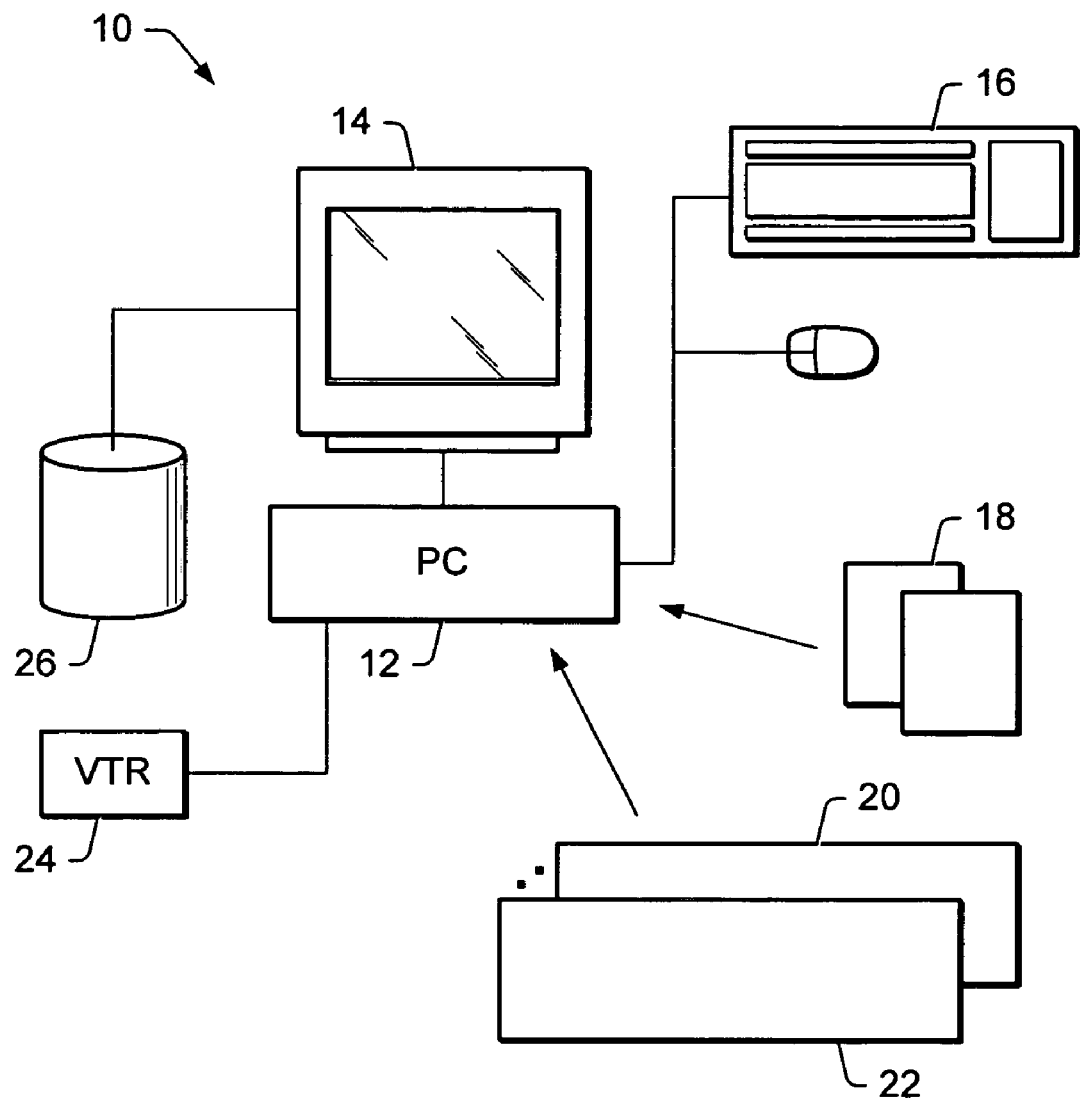
FIG. 1 is a block diagram of a nonlinear video editing system including a compositing system.

Referring to FIG. 1, nonlinear video editing and compositing system 10 includes host computer 12 having monitor 14, user input devices 16 (e.g., keyboard and mouse), video editing and compositing software 18, video editing peripheral board 20 in an expansion slot of computer 12, plug-in video hardware filters 22 in an expansion slot of computer 12 or otherwise connected thereto, video tape recorder (VTR) 24, and mass storage disc 26.

Board 20 includes various intrinsic video filter functions such as, but not limited to, keying, color correction, digital video effects (DVE), compositing, and audio mixing. The software 18 includes such video filter functions as blurs, twirl, etc. The plug-in filters 22, e.g., obtainable from third party vendors, can include such filter functions as special blurs, three-dimensional DVE, etc. Examples of tools that can be implemented as filter functions include: input digitize tool, matte tool, master out tool, paint tool, color corrector, keyer (e.g., chroma and/or luminance key process), motion effects tools (e.g., fast or slow motion), timeline tool (which can do editing (horizontal) and layering (vertical) operations), motion tracking and third party applications.

Figure 2:
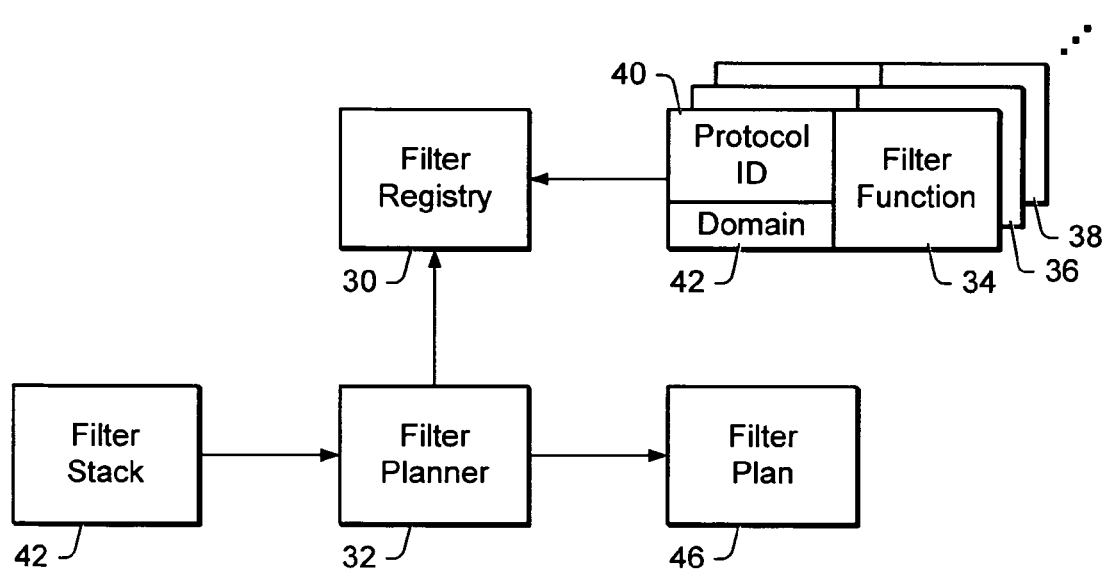
FIG. 2 is a diagram of the compositing system implemented on the FIG. 1 system.

Referring to FIG. 2, the compositing system 30, which is implemented by software 18 and computer 12, includes filter registry 30 and filter planner 32. Filter registry 30 includes information on filter operations that can be carried out by the filter functions 34, 36, 38, etc. In particular it includes a filter protocol identifier 40 (which can be a list of protocol identifiers) and operating domain 42 for each filter function. The filter protocol identifier specifies the type of operation, e.g., a blur, rotation, color conversion, etc. Some filter functions can carry out a plurality of operations in sequence, and the filter protocol identifier 40 stored in registry 30 for that filter function would thus include a list of protocol identifiers. The operating domain specifies whether the filter function applies to video, audio, video parameters or audio parameters and also specifies input and output conditions. E.g., the conditions might specify that one filter function blurs YUV 4:2:2, and another blurs 32 RGB, and a third works in hardware but only for blurs less than 5 pixels in diameter. The filter registry 30 is updated at start-up of PC 12 so that it is current with respect to filter functions that may have been added or removed.

As shown in FIG. 2, filter planner 32 receives filter stack 44, and generates filter plan 46. Filter stack 42 specifies filter operations to be performed on a video clip. The operations are specified by a filter protocol identifier and operating domain. The filter stack 42 is generated on monitor 14 by a user entering the appropriate information at input devices 16 in response to prompts on monitor 14. Filter planner 32 examines the operations specified in the filter stack 42 and determines an appropriate available filter function (e.g., 34, 36, 38) to be used for each filter operation specified in the stack based upon the protocol identifiers 40 and operating domains 42 listed in filter registry 30. The filter plan 46 includes the identification of the selected filter function.

Figure 3:
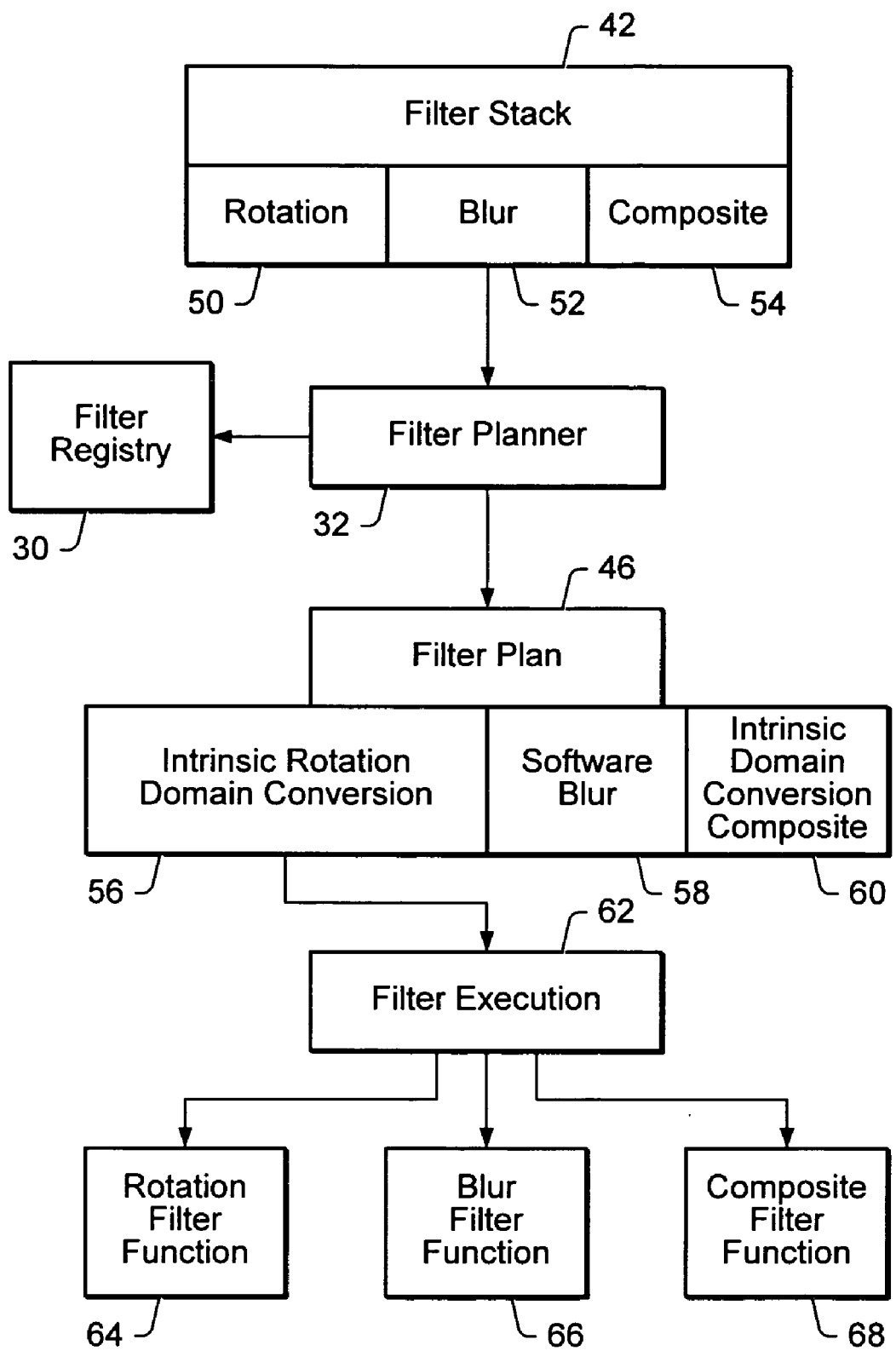
FIG. 3 shows the generation of a filter plan for execution by a filter executor on the FIG. 1 system.

As shown in FIG. 3, filter stack 42 can specify such operations as rotation 50, blur 52, and composite 54. Filter planner 32 then queries filter registry 30 and creates filter plan 46, which specifies the use of an intrinsic rotation filter function in box 56 to carry out the specified rotation filter operation 50, a software blur filter function in box 58 to carry out the specified blur filter operation 52, and an intrinsic composite filter function in box 60 to carry out the specified composite filter operation 54. Filter plan 46 also specifies a domain conversion after the rotation in box 56, so that the clip can be processed in software in the next operation. Filter plan 46 also specifies a second domain conversion prior to the intrinsic composite in box 60.

Filter plan 46 is executed by filter executor 62, which then controls rotation filter function 64, blur filter function 66, and composite filter function 68. Filter executor 62 also sets up buffering, data access and routing and domain conversions as necessary prior to, between and after the filtering at filter functions 64, 66, 68.

The requested operations are specified independently from the implementation of the action, and the operation of filter planner 32 is transparent to the user. E.g., there could be a number of different filter functions that could carry out a specified filter operation in stack 42, and filter planner 32 will select the one that is most appropriate.

Other embodiments of the invention are within the scope of the appended claims.

What is claimed is:

1. A system for modifying video comprising:
   a filter stack configured to store a first set of user input specifying filter operations, including a first filter operation, to be carried out on a video clip;
   a filter registry having stored therein information on a plurality of filter functions, wherein the plurality of filter functions comprises one or more software filters executable on a computer processor and one or more hardware filters executable on video processing circuitry, wherein the plurality of filter functions comprises at least two filter functions, each of which is configured to perform the first filter operation, wherein the at least two filter functions include at least one hardware filter usable to perform the first filter operation and at least one software filter usable to perform the first filter operation;
   a filter planner configured to use information received from the filter stack and the filter registry to generate a filter plan specifying a first set of filter functions executable to perform the filter operations specified by the first set of user input, wherein the filter planner is configured to select the first set of filter functions from among the plurality of filter functions to achieve a first optimization of the filter operations specified by the first set of user input, wherein the filter planner is configured to generate at least a portion of the filter plan by selecting between the at least two filter functions to perform the first filter operation, and wherein operation of the filter planner is transparent to a user of the system;
   a filter executor configured to receive the filter plan from the filter planner and to control the first set of filter functions according to the filter plan to carry out filter operations specified by the first set of user input on the video clip; and
   a nonlinear video editor including a storage containing video data, the computer processor, and the video processing circuitry, wherein the video processing circuitry is configured to randomly access video data from the storage to output video clips.

2. The system of claim 1 wherein the first set of user input also specifies a second filter operation, wherein the system is configured to perform the first filter operation using at least one of the one or more software filters, and wherein the system is configured to perform the second filter operation using at least one of the one or more hardware filters.

3. The system of claim 1 wherein the system is configured to generate the filter plan by selecting hardware filters and software filters optimized for the filter operations specified in the filter stack.

4. The system of claim 1, wherein the system is also configured to composite audio associated with the video clip, and wherein the filter operations include operations to be carried out on an audio segment associated with the video clip.

5. The system of claim 1, wherein one or more filter operations specified by the first set of user input include both a filter protocol identifier and an operating domain.

6. The system of claim 5, wherein the first filter operation has an operating domain that corresponds to audio, and wherein the filter operations specified by the first set of user input include a second filter operation having an operating domain that corresponds to video.

7. The system of claim 1, wherein the filter operations specified by the first set of user input include one or more of the following types of operations: fades, blurs, transitions, dissolves, rotations.

8. The system of claim 1, wherein the system is configured to use a different filter planner to generate, from the first set of user input, a different filter plan to achieve a second optimization distinct from the first optimization.

9. The system of claim 1, wherein the system is configured to select the filter planner from among a plurality of filter planners to generate the filter plan to perform the filter operations specified by the first set of user input, wherein each of the plurality of filter planners is configured to achieve a different optimization.

10. A system for modifying video comprising:
    a filter stack configured to store a first set of user input specifying filter operations, including a first filter operation, to be carried out on a video clip;
    a filter registry having stored therein information on a plurality of filter functions, wherein the plurality of filter functions comprises at least two filter functions, each of which is configured to perform the first filter operation, wherein the plurality of filter functions comprises at least one filter function configured to perform at least two different filter operations; and
    a filter planner configured to use information received from the filter stack and the filter registry to generate a filter plan specifying a first set of filter functions executable to perform the filter operations specified by the first set of user input, wherein the filter planner is configured to select the first set of filter functions from among the plurality of filter functions to achieve a first optimization of the specified filter operations, wherein the filter planner is configured to generate the filter plan in part by selecting between the at least two filter functions to perform the first filter operation, and wherein the filter planner is configured to select between the at least two filter functions without input from a user of the system specifying a selection of one of the at least two filter functions.

11. The system of claim 10, wherein the filter operations include one or more of the following types of operations: fades, blurs, transitions, dissolves, rotations.

12. The system of claim 10, wherein the filter plan specifies both hardware and software filter functions.

13. The system of claim 10, further comprising a filter executor configured to receive the filter plan from the filter planner and control the first set of filter functions according to the filter plan to perform the filter operations on the video clip.

14. The system of claim 10, wherein the system is configured to use a different filter planner to generate, from the first set of user input, a different filter plan to achieve a second optimization different from the first optimization.

15. The system of claim 10, wherein the system is configured to select the filter planner from among a plurality of filter planners to generate the filter plan to perform the filter operations specified by the first set of user input, wherein each filter planner is configured to achieve a different optimization.

16. The system of claim 10, wherein the information in the filter registry is automatically updated upon a start-up of the system.

17. An apparatus, comprising:
a computer system configured to apply one or more of a plurality of filters to an input video clip, said system including a memory configured with program instructions executable to:
receive a first set of input from a user specifying one or more filter operations, including a first filter operation, to be carried out on said input video clip; and
select one or more of a plurality of filters to perform said one or more filter operations specified by the first set of input, wherein the plurality of filters comprises at least two filters, each of which is configured to perform the same first filter operation, wherein said one or more filters are selected from a filter registry to achieve a first optimization of the filter operations specified by the first set of user input, and wherein said one or more filters are selected in a manner that is transparent to a user of the computer system;
wherein the at least two filters include at least one hardware filter and at least one software filter.

18. The system of claim 17, wherein said hardware filters include plug-in filters.

19. The apparatus of claim 17, wherein one or more of said plurality of filters are configured to perform audio filtering on audio associated with said video clip.

20. The apparatus of claim 17, wherein said filter registry specifies a first operating domain for a first filter, wherein said first operating domain indicates whether said first filter applies to one or more of the following: audio, video, audio parameters, video parameters.

21. The apparatus of claim 20, wherein said first operating domain specifies input and output conditions for said first filter.

22. The apparatus of claim 17, wherein said filter registry comprises a protocol identifier for a first filter, said protocol identifier specifying at least one type of operation for said first filter.

23. The apparatus of claim 17, wherein the program instructions are further executable to:
select a filter planner from among a plurality of filter planners to select the one or more filters to perform the one or more filter operations specified by the first set of user input, wherein each of the plurality of filter planners is configured to achieve a different optimization.

24. An apparatus, comprising:
a computer system configured to apply one or more of a plurality of filters to an input video clip, said system including a memory configured with program instructions executable to:
receive a first set of input from a user specifying one or more filter operations, including a first filter operation, to be carried out on said input video clip, wherein the user specification of the first filter operation comprises information specifying a type of the first filter operation and at least one parameter for the first filter operation; and
select one or more of a plurality filters to perform said one or more filter operations specified by the first set of user input, wherein the plurality of filters comprises at least two filters, each of which is configured to perform the specified first filter operation, wherein said one or more filters are selected from a filter registry to achieve a first optimization of the filter operations specified by the first set of user input, and wherein one of said at least two filters is selected to perform the first filter operation without filter selection input from a user of the computer system.

25. The apparatus of claim 24, wherein the program instructions are further executable to:
select a first filter planner from among a plurality of filter planners to select the one or more filters to perform the filter operations specified by the first set of user input, wherein said first filter planner is configured to select the one or more filters to achieve the first optimization.

26. The apparatus of claim 24, wherein said system is configured to update said filter registry upon start-up of said computer system.

27. The apparatus of claim 24, wherein the at least two filters include a hardware filter and a software filter.

28. An apparatus, comprising:
a computer system configured to apply one or more of a plurality of filters to an input video clip, said system including a memory configured with program instructions executable to:
receive a first set of input from a user specifying one or more filter operations, including a first filter operation, to be carried out on said input video clip, wherein the first set of input comprises information specifying a type of the first filter operation and information specifying at least one parameter for the first filter operation; and
select a plurality of filters to perform said one or more filter operations specified by the first set of input, wherein the plurality of filters comprises at least two filters, each of which is configured to perform the first filter operation, wherein said plurality of filters are selected from a filter registry to achieve a first optimization of the filter operations specified by the first set of user input, and wherein said plurality of filters is selected in a manner that is transparent to a user of the computer system;

wherein the at least two filters comprises a software filter and a hardware filter.

29. The apparatus of claim 28, wherein the program instructions are further executable to:

select a first filter planner from among a plurality of filter planners to select the one or more filters to perform the filter operations specified by the first set of user input, wherein said first filter planner is configured to achieve the first optimization.

30. A method, comprising:

a video editing system receiving a first set of user input specifying one or more filter operations, including a first filter operation, to be performed by the video editing system, wherein the user input specifying the first filter operation comprises information specifying a type of the first filter operation and at least one parameter for the first filter operation;

the video editing system selecting one or more filter functions to perform said filter operations specified by the first set of user input, wherein said selecting comprises accessing a memory storing information relating to a plurality of filter functions, wherein the plurality of filter functions comprises at least two filter functions, each of which is configured to perform the first filter operation, and wherein the selecting comprises selecting between the at least two filter functions to perform the first filter operation specified by the first set of user input, and wherein the selecting is performed without a user of the video editing system specifying which of the at least two filter functions is to be selected to perform the first filter operation.

31. The method of claim 30, wherein said one or more filter functions include at least one filter function implemented in hardware and at least one filter function implemented in software.

32. The method of claim 30, wherein the selecting is performed to achieve a first optimization of the one or more filter operations specified by the first set of user input.

33. The method of claim 30, further comprising:

the video editing system executing said one or more filter functions on an input video clip.

34. The method of claim 30, wherein the selecting is performed by a first filter planner.

35. The method of claim 34, further comprising the video editing system selecting the first filter planner from among a plurality of filter planners to generate a filter plan to perform the filter operations specified by the first set of user input.

36. The method of claim 30, further comprising the video editing system updating said information relating to said plurality of filter functions upon start-up of said system.

37. The method of claim 30, wherein the plurality of filter functions comprises at least one filter function configured to perform at least two filter operations.

38. The method of claim 30, wherein the at least two filter functions include at least one hardware filter and at least one software filter.

39. An article of manufacture including a non-transitory computer-readable memory having program instructions stored thereon that, if executed by a video editing system, cause said system to perform operations comprising:

receiving a first set of user input specifying one or more filter operations, including a first filter operation, to be performed by said system, wherein the first set of user input comprises information specifying a type of the first filter operation and at least one parameter for the first filter operation;

selecting, by accessing a memory having stored therein information relating to a plurality of filter functions, a first set of filter functions to perform said filter operations specified by the first set of user input, wherein the plurality of filter functions comprises at least two filter functions, each of which is configured to perform the first filter operation, wherein the first set of filter functions are selected from among the plurality of filter functions to achieve a first optimization, and wherein selection of the first set of filter functions comprises selecting between the at least two filter functions to perform the first filter operation without a user of said system specifying which of the at least two filters is to be selected.

40. The article of manufacture of claim 39, wherein said first set of filter functions include at least one filter function implemented in hardware and at least one filter function implemented in software.

41. The article of manufacture of claim 39, wherein the operations further comprises:

executing said first set of filter functions on an input video clip.

42. The article of manufacture of claim 39, wherein the first set of filter functions are selected by a first filter planner, wherein the first filter planner is configured to select the first set of filter functions to perform the filter operations specified by the first set of user input to achieve a first optimization.

43. The article of manufacture of claim 42, wherein operations further comprises:

selecting the first filter planner from among a plurality of filter planners; and using the first filter planner to select the first set of filter functions to perform the filter operations specified by the first set of user input.

44. The article of manufacture of claim 42, wherein operations further comprises:

selecting a second filter planner from among the plurality of filter planners; and using the second filter planner to select a different set of filter functions to perform the filter operations specified by the first set of user input to achieve a second optimization different from the first optimization.

45. The article of manufacture of claim 39, the method further comprising updating said information relating to said plurality of filter functions upon start-up of said system.

46. The article of manufacture of claim 39, wherein the plurality of filter functions comprises at least one filter function configured to perform at least two filter operations.

47. The article of manufacture of claim 39, wherein the at least two filter functions include at least one hardware filter and at least one software filter.

48. A system for modifying video comprising:

a filter planner configured to generate a filter plan specifying a first set of filter functions executable to perform filter operations, including a first filter operation, specified by a first set of user input, wherein the first set of user input comprises information specifying a type of operation for the first filter operation and information specifying at least one parameter for the first filter operation, wherein the filter planner is configured to select the first set of filter functions from among a plurality of filter functions to achieve a first optimization of the filter operations specified by the first set of user input, and wherein the filter planner is configured to select the first set of filter functions without input from a user of the system specifying that the first set of filter functions are to be selected;

a filter executor configured to receive the filter plan from the filter planner and to control the first set of filter functions according to the filter plan to carry out the filter operations specified by the first set of user input on a video clip; and a memory containing video data corresponding to the video clip.

49. The system of claim 48, further comprising:

a filter stack configured to store the first set of user input specifying the filter operations to be carried out on the video clip, wherein the filter operations include a first filter operation;

a filter registry having stored therein information on the plurality of filter functions, wherein the plurality of filter functions comprises one or more software filters executable on the system and one or more hardware filters executable on video processing circuitry of the system, wherein the plurality of filter functions comprises at least two filter functions, each of which is configured to perform the first filter operation;

wherein the filter planner is configured to use information received from said filter stack and said filter registry to generate the filter plan; and wherein the filter planner is configured to generate at least a portion of the filter plan by selecting between the at least two filter functions to perform the first filter operation.

50. The system of claim 49, wherein said first set of user input also specifies a second filter operation, wherein said system is configured to perform said first filter operation using at least one of said one or more software filters, and wherein said system is configured to perform said second filter operation using at least one of said one or more hardware filters.

51. The system of claim 49, wherein said system is configured to generate said filter plan by selecting hardware filters and software filters optimized for the filter operations specified in said filter stack.

52. The system of claim 49, further comprising the video processing circuitry, wherein the video processing circuitry is configured to randomly access video data from said memory to implement said one or more hardware filters.

53. The system of claim 48, further comprising a different filter planner configured to generate a different filter plan specifying a second set of filter functions executable to perform the filter operations specified by the first set of user input, wherein said different filter planner is configured to select the second set of filter functions from among the plurality of filter functions to achieve a second optimization of the filter operations specified by the first set of user input, and wherein the different filter planner is configured to select the second set of filter functions without input from the user specifying that the second set of filter functions are to be selected, and wherein the second optimization is different from the first optimization, and wherein the first and second set of filter functions are not identical.

54. An apparatus, comprising:

a processor;

a memory having stored therein program instructions executable by the processor to:

receive a first set of input from a user of the apparatus, the first set of input specifying one or more filter operations to be carried out on an input video clip;

generate a first filter plan that comprises a first set of one or more of a plurality of filters available to the apparatus, wherein the first set of filters is executable to perform the one or more filter operations specified by the first set of input, and wherein the first set of filters are selected to be included in the first filter plan in a manner that is transparent to the user; and apply the selected one or more filters to the input video clip;

wherein the first set of input specifies a first filter operation, and wherein the plurality of filters include first and second filters, each of which is executable to perform the first filter operation, and wherein the program instructions are executable to select between the first and second filters for inclusion in the first filter plan without input from the user specifying which of the first and second filter is to be selected.

55. The apparatus of claim 54, wherein the program instructions are further executable to generate a second filter plan that comprises a second set of one or more of the plurality of filters, wherein the second set of filters comprises a different filter for performing the first filter operation than the first set of filters does.

56. An apparatus, comprising:

means for storing a first set of user input specifying filter operations, including information specifying a type of a first filter operation and information specifying at least one parameter for the first filter operation;

means for generating a filter plan specifying a first set of filter functions executable to perform filter operations specified by the first set of user input, including by selecting from among a plurality of filter functions to perform the first filter operation, wherein each of the plurality of filter functions is usable to perform the first filter operation, and wherein the selecting is performed without input from a user of the apparatus that specifies which of the plurality of filter functions is to be selected;

means for receiving said filter plan and for controlling said first set of filter functions according to said filter plan to carry out said filter operations specified by the first set of input on an input video clip.

* * * * *

UNITED STATES PATENT AND TRADEMARK OFFICE
CERTIFICATE OF CORRECTION

| | | |
|---|---|---|
| PATENT NO. | : 7,873,260 B2 | Page 1 of 1 |
| APPLICATION NO. | : 10/077107 | |
| DATED | : January 18, 2011 | |
| INVENTOR(S) | : Manickavasagam et al. | |

It is certified that error appears in the above-identified patent and that said Letters Patent is hereby corrected as shown below:

Column 4, line 18, in Claim 2, after "claim 1" insert -- , --.

Column 4, line 24, in Claim 3, after "claim 1" insert -- , --.

Column 8, line 30, in Claim 43, delete "wherein" and insert -- wherein the --.

Column 8, line 37, in Claim 44, delete "wherein" and insert -- wherein the --.

Signed and Sealed this
Twenty-fourth Day of May, 2011

David J. Kappos
*Director of the United States Patent and Trademark Office*